United States Patent
Golobokov et al.

(10) Patent No.: US 11,354,872 B2
(45) Date of Patent: Jun. 7, 2022

(54) USING PORTRAIT IMAGES IN AUGMENTED REALITY COMPONENTS

(71) Applicant: Snap Inc., Santa Monica, CA (US)

(72) Inventors: Roman Golobokov, London (GB); Aleksandr Mashrabov, Los Angeles, CA (US); Dmitry Matov, London (GB); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/949,700

(22) Filed: Nov. 11, 2020

(65) Prior Publication Data

US 2022/0148276 A1 May 12, 2022

(51) Int. Cl.

| | |
|---|---|
| *G09G 5/00* | (2006.01) |
| *G06T 19/20* | (2011.01) |
| *G06T 19/00* | (2011.01) |
| *H04L 51/04* | (2022.01) |
| *H04L 51/10* | (2022.01) |
| *G06T 13/40* | (2011.01) |
| *G06T 11/60* | (2006.01) |

(Continued)

(52) U.S. Cl.
CPC ............ *G06T 19/20* (2013.01); *G06N 20/00* (2019.01); *G06T 11/60* (2013.01); *G06T 13/40* (2013.01); *G06T 19/006* (2013.01); *G06V 40/165* (2022.01); *H04L 51/04* (2013.01); *H04L 51/10* (2013.01); *G06T 2219/2012* (2013.01); *G06T 2219/2024* (2013.01)

(58) Field of Classification Search
CPC ........ G06T 11/60; G06T 13/40; G06T 19/006
See application file for complete search history.

(56) References Cited

U.S. PATENT DOCUMENTS

| | | | | |
|---|---|---|---|---|
| 2011/0304611 A1* | 12/2011 | Suzuki | ................... | G06T 15/04 345/419 |
| 2012/0094754 A1* | 4/2012 | Suzuki | ................ | A63F 13/5258 463/30 |

(Continued)

OTHER PUBLICATIONS

"International Application Serial No. PCT/US2021/058818, International Search Report dated Mar. 15, 2022", 4 pgs.

(Continued)

*Primary Examiner* — Charles Tseng
(74) *Attorney, Agent, or Firm* — Schwegman Lundberg & Woessner, P.A.

(57) ABSTRACT

The technical problem of creating an augmented reality (AR) experience that, on one hand, is accessible from a camera view user interface provided with a messaging client and that, also, can perform a modification based on a previously captured image of a user, is addressed by providing an AR component. When a user, while accessing the messaging client, engages a user selectable element representing the AR component in the camera view user interface, the messaging system loads the AR component in the messaging client. The AR component comprises a target media content object, which can be animation or live action video. The loaded AR component accesses a portrait image associated with a user and modifies the target media content using the portrait image. The resulting target media content object is displayed in the camera view user interface.

16 Claims, 11 Drawing Sheets

(51) Int. Cl.
    *G06N 20/00*    (2019.01)
    *G06V 40/16*    (2022.01)

(56) References Cited

U.S. PATENT DOCUMENTS

| | | | |
|---|---|---|---|
| 2012/0218423 A1* | 8/2012 | Smith | G06K 9/00369 |
| | | | 348/207.1 |
| 2013/0101164 A1 | 4/2013 | Leclerc et al. | |
| 2014/0168261 A1* | 6/2014 | Margolis | A63F 13/65 |
| | | | 345/633 |
| 2017/0236337 A1* | 8/2017 | Devries | G06F 3/0304 |
| | | | 345/419 |
| 2017/0243387 A1* | 8/2017 | Li | G06K 9/00281 |
| 2018/0204599 A1* | 7/2018 | Garrett | G06T 7/38 |
| 2020/0228539 A1* | 7/2020 | Bonar | G06K 9/3216 |

OTHER PUBLICATIONS

"International Application Serial No. PCT/US2021/058818, Written Opinion dated Mar. 15, 2022", 6 pgs.

* cited by examiner

USING PORTRAIT IMAGES IN AUGMENTED REALITY COMPONENTS

TECHNICAL FIELD

The present disclosure relates generally to manipulating electronic content.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, can be designed to run on a mobile device such as a phone, a tablet, or a watch, while having a backend service provided on a server computer system to perform operations that may require resources greater than is reasonable to perform at a client device (e.g., storing large amounts of data or performing computationally expensive processing). For example, a messaging client and the associated messaging server system may be configured to permit online users to share content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
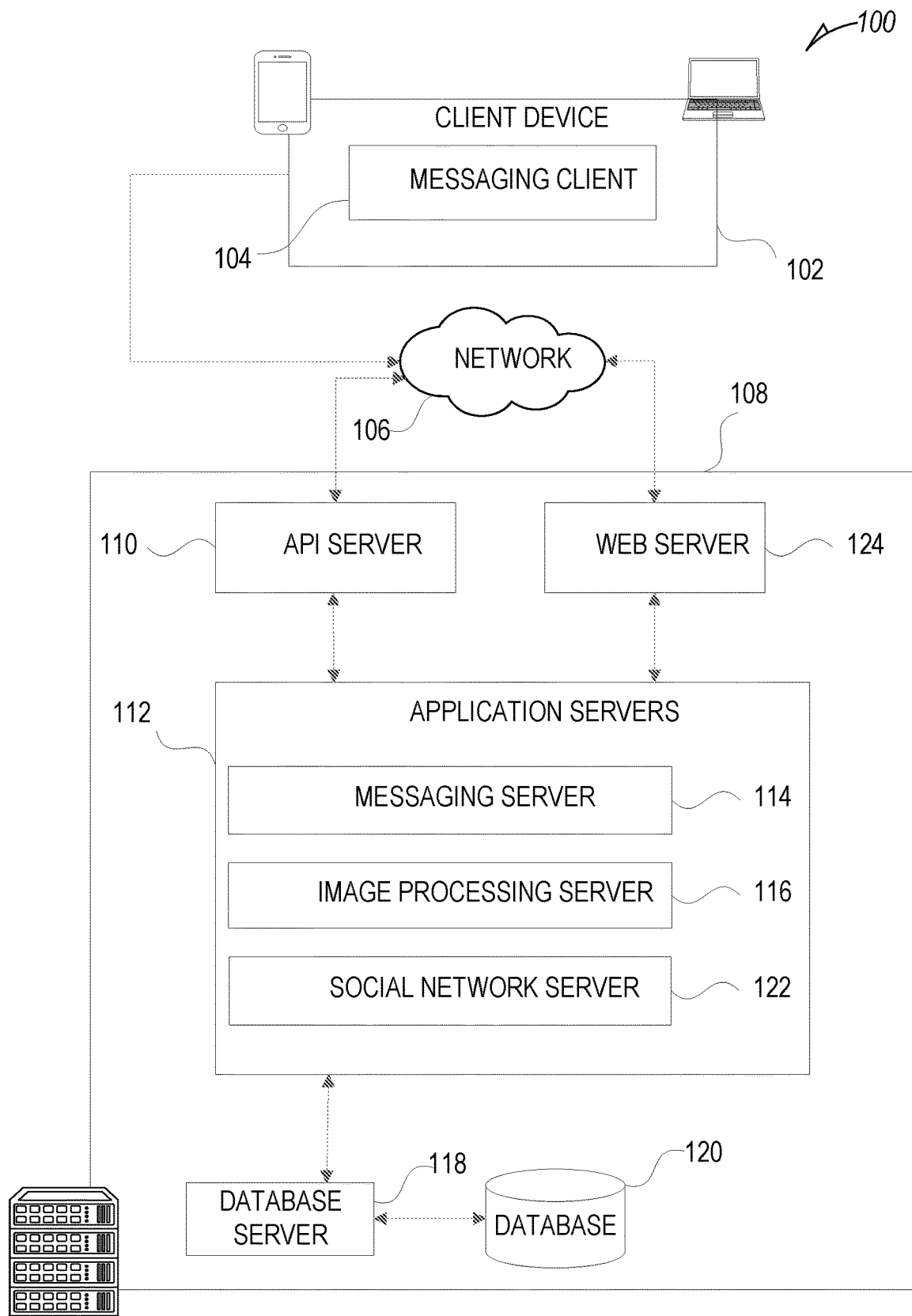
FIG. 1 is a diagrammatic representation of a networked environment in which the present disclosure may be deployed, in accordance with some examples.

Embodiments of the present disclosure improve the functionality of electronic messaging software and systems by enhancing users' experience of engaging with augmented reality technology.

A messaging system that hosts a backend service for an associated messaging client is configured to permit users to capture images and videos with a camera provided with a client device that hosts the messaging client and to share the captured content with other users via a network communication. The messaging system is also configured to provide augmented reality (AR) components accessible via the messaging client. AR components can be used to modify content captured by a camera, e.g., by overlaying pictures or animation on top of the captured image or video frame, or by adding three-dimensional (3D) effects, objects, characters, and transformations. An AR component may be implemented using a programming language suitable for app development, such as, e.g., JavaScript or Java. The AR components are identified in the messaging server system by respective AR component identifiers.

A user can access functionality provided by an AR component by engaging a user-selectable element included in a camera view user interface presented by the messaging client. A camera view user interface is configured to display the output of a digital image sensor of a camera provided with an associated client device, to display a user selectable element actionable to capture an image by the camera or to start and stop video recording, and also to display one or more user selectable elements representing respective AR components. The camera view user interface may include one or more user selectable elements that permit a user to apply and also to remove the visual effect produced by the AR component. A screen displayed by the messaging client, which can include the output of a digital image sensor of a camera, a user selectable element actionable to capture an image by the camera or to start and stop video recording, and also can display one or more user selectable elements representing respective AR components is referred to as a camera view screen. A user selectable element representing an AR component is actionable to launch the AR component. When the AR component is launched, the output of a digital image sensor of a camera displayed in the camera view user interface is augmented with the modification provided by the AR component. For example, an AR component can be configured to detect the head position of the person being captured by the digital image sensor and overlay an image of a party hat over the detected head position, such that the viewer would see the person presented as wearing the party hat. In many examples, AR components modify, in real time, the output of a digital image sensor of a camera displayed in the camera view user interface.

The technical problem of creating an AR experience that, on one hand, is accessible from the camera view user interface and that, also, can perform a modification based on a previously captured and stored image of a user, is addressed by providing an AR component configured to include this functionality. For the purposes of this description, a previously captured and stored image of a user is referred to as a portrait image.

When a user, while accessing the messaging client, engages a user selectable element representing the AR component in the camera view user interface presented by the messaging client, the messaging system loads the AR component in the messaging client. The AR component comprises a target media content object, which can be animation or live action video. The target media content object includes a portion, e.g., a placeholder object, that can receive, or that can be replaced with, content corresponding to a human face from a portrait image. For the purposes of this description, the content corresponding to a human face from a portrait image is referred to as merely a face object. The AR component can be configured to use a face detection methodology to derive a face object from a portrait image. Some example face detection methodologies are described below in the context of augmented reality tools, with reference to FIG. 3. The loaded AR component accesses a portrait image associated with the user and modifies the target media content object by inserting the face object from the portrait image into the placeholder object in the target media content object. The resulting target media content object is displayed in the camera view user interface.

The resulting target media content object can be displayed in the camera view user interface as overlaid over a portion of the output of a digital image sensor of the camera. For example, in the case where a user is using a front facing camera such that the output of the digital image sensor of the camera is the image of the user, and where the target media content object is an animation of a cartoon animal with rabbit ears, the camera screen view displays the image of the user captured by the digital image sensor of the camera and, also, cartoon animal with rabbit ears that has the user's face.

In another example, the AR component includes a background image, and the resulting target media content object is overlaid over the background image, such that the resulting target media content object overlaid over the background image is presented on the camera view screen instead of the output of a digital image sensor of the camera. In this example, the output of a digital image sensor of the camera is not visible in the camera view screen. Another example where the resulting target media content object is presented on the camera view screen instead of the output of a digital image sensor of the camera is where the target media content object associated with the AR component is a live action video, in which the faces of one or more characters in the video are replaced with the face object from the portrait image of the user.

In yet another example, the aspects of the resulting target media content object, such as the spatial placement of the overlaid target media content object, may be in response to the movement of a user detected by the digital image sensor of the camera. For instance, the AR component may be configured to shift the position of the overlaid target media content object from one side of the camera view user interface to another in response to the detected head movement of the subject user displayed in the camera view screen.

In some examples, the AR component includes one or more machine learning models for face object animation, where a model is constructed to re-render a face object derived from the portrait image of a user with different facial expressions or to re-render a face object from the portrait image to appear as turned to one side or another.

The AR component may include multiple target media content objects, which may be distinct media content items or multiple copies of the same media content item. In addition to a target media content object configured to include a placeholder for the face object from a portrait image of a user, the AR component may also be configured to apply a modification to the image or video being captured by a camera associated with the messaging client that is being accessed by the user. For example, the modification applied to the output of a digital image sensor of a camera applied by the AR component may, in addition to overlaying the associated modified target media content object over a portion of a captured frame, may also overlay an image of a party hat over the head position detected in the frame or distort the image of the user's head and face in the captured frame.

A user's profile in the messaging system may indicate that the user's profile is related to another profile in the messaging system as a "friend" profile, also referred to as a connected profile. A user represented in the messaging system by a profile that indicates a connection with a further profile that represents a further user, may be permitted to exchange content with the further user in a manner that may not be permitted to a user whose profile does not indicate a friendship relationship with the further user. In some examples, the AR component may be configured to utilize a portrait image of a further user, where the further user is represented in the messaging system by a profile that is distinct from the profile of the first user who is accessing the messaging client. The further user may be a connection, also termed a "friend," of the first user in the messaging system. The AR component that utilizes a portrait image of a further user, modifies the target media content object by inserting the face object from the portrait image of the further user into the placeholder object in the target media content object.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data). For example, the messaging client 104 permits a user to access functionality provided by the AR component, which may reside, at least partially, at the messaging server system 108. As explained above, the AR component comprises a target media content object, and is configured to modify the target media content object by inserting the face object derived from the portrait image of the user into the placeholder object in the target media content object.

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity. For example, with respect to the functionality provided by the AR component, the operations of deriving the face object from the portrait image, and generating a modified target media content object by replacing a portion of the target media content object with the face object, which are performed in response to detecting activation of the user selectable element representing the augmented reality component, may be executed at the messaging server system 108 in order to conserve resources of the client device 102 hosting messaging client 104. Alternatively, if it is determined that the client device 102 hosting messaging client 104 has sufficient processing resources, some or all of these operations may be executed by the messaging client 104.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104. For example, the messaging client 104 can present a camera view user interface that displays the output of a digital image sensor of a camera of the client device 102, and also to display a user selectable element actionable to load the AR component in the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, which can be hosted or supported by the image processing server 116. An example of an AR component, as discussed above, is the AR component, which comprises a target media content object, and is configured to modify the target media content object by inserting the face object derived from the portrait image of the user into the placeholder object in the target media content object.

Figure 3:
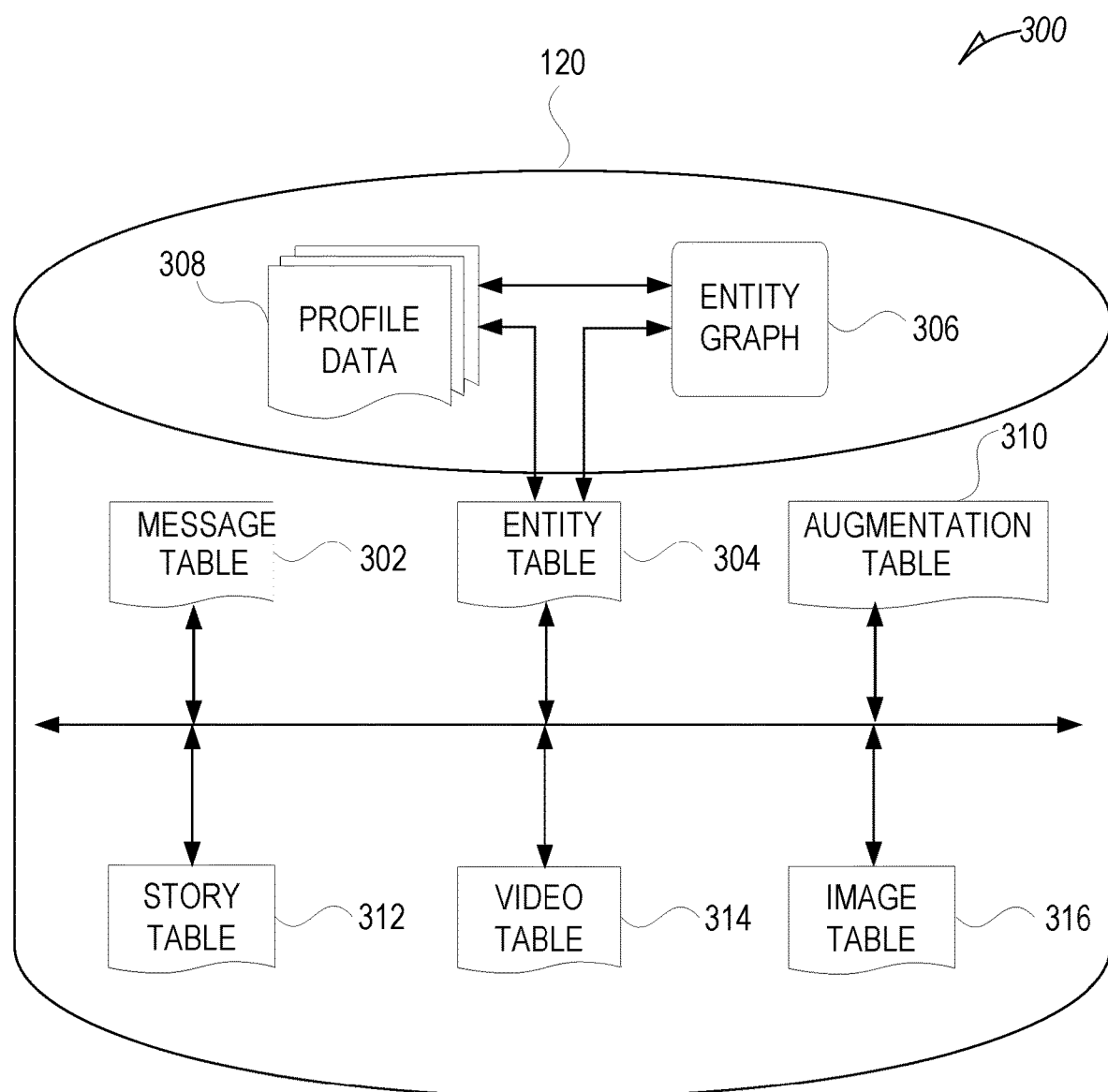
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has a "friend" relationship or is "following," and also the identification of other entities and interests of a particular user. With reference to the functionality provided by the AR component, the identification, by the social network server 122, of other users of the messaging system 100, with which a particular user has a "friend" relationship, can be used to determine the identification of a further user, whose portrait image is to be used by the AR component for deriving the face object, which is then used to modify the target media content object associated with the AR component by inserting the face object from the portrait image of the further user into the placeholder object in the target media content object.

System Architecture

Figure 2:
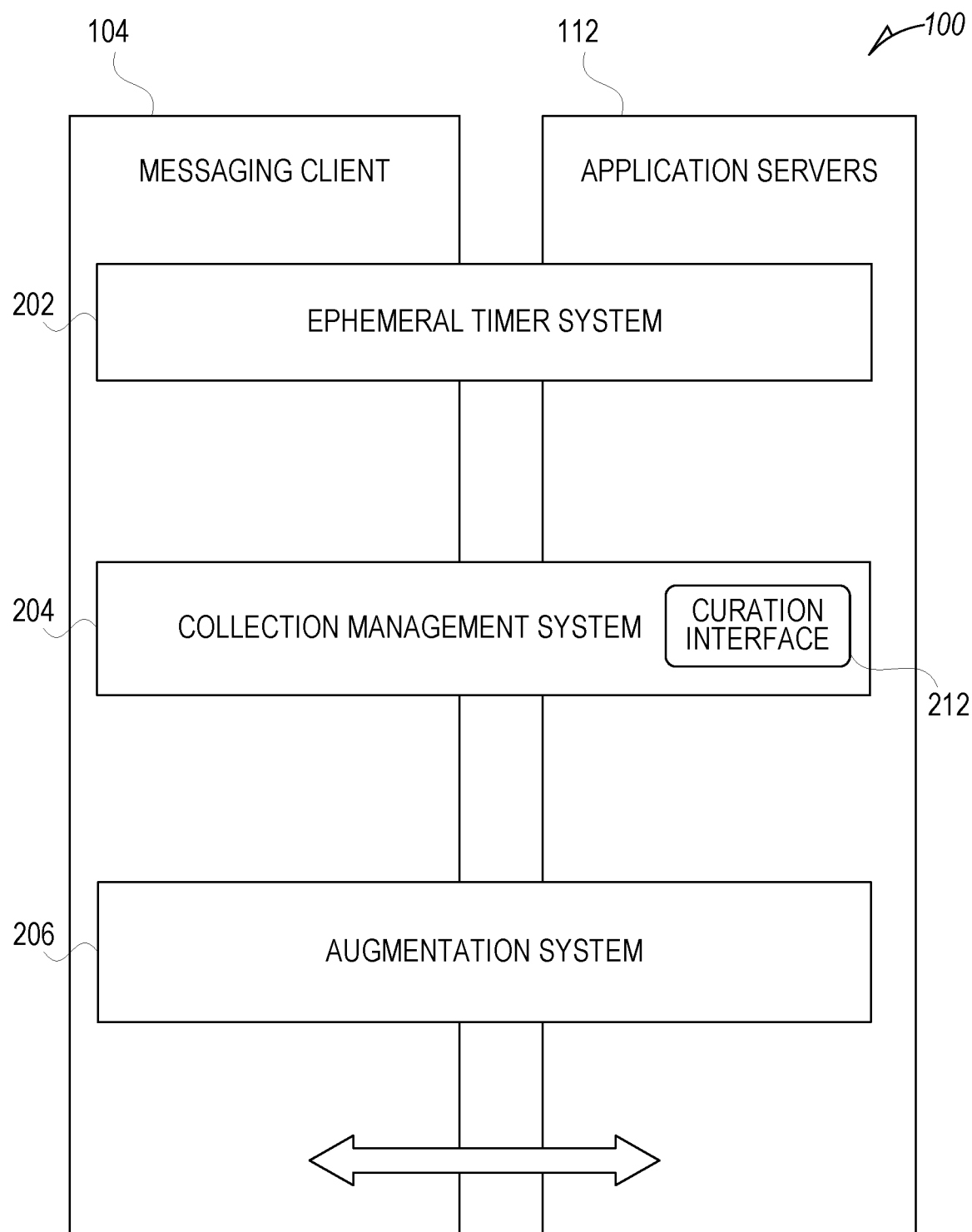
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, and an augmentation system 206.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. In a further example, a collection may include content, which was generated using one or more AR components, including the AR component that may include content captured by a camera augmented using a media content object modified using a previously captured and stored image of the user. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system 100. The media overlays may be stored in the database 120 and accessed through the database server 118.

With reference to the AR component, the media overlay associated with the AR component is referred to as a target media content object. As explained above, a target media content object includes a placeholder object, that can receive, or that can be replaced with, content corresponding to a human face from a portrait image (a face object). The AR component, when loaded in a messaging client that receives input from a user, accesses a portrait image associated with the user and modifies the target media content object by inserting the face object from the portrait image into the placeholder object in the target media content object. The resulting target media content object may be overlaid over the output of the digital image sensor of the associated camera in the camera view user interface presented by the messaging client. Example operations performed by the augmentation system 206, illustrating some of the functionality provided by the AR component, are described with reference to FIG. 6 further below.

In some examples, the augmentation system 206 is configured to provide access to AR components that can be implemented using a programming language suitable for app development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

As stated above, an example of an AR component is the AR component that, when loaded in a messaging client that receives input from a user, accesses a portrait image associated with the user and modifies the target media content object by inserting the face object derived from the portrait image into the placeholder object in the target media content object. In some examples, the AR component is configured to utilize face detection technology to derive a face object from a portrait image. Examples of face detection technology include Viola-Jones feature based object detection framework and deep learning methods, such as "Multi-Task Cascaded Convolutional Neural Network," or MTCNN.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

With reference to the functionality provided by the AR component, the profile data 308 stores the portrait image of a user or a reference to the portrait image. The portrait image is provided by the user represented by an associated profile. The portrait image can used by the AR component when the AR component is loaded in the messaging client 104, as described above.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a target media content object, which may be associated with an AR component and used to generate an AR experience for a user, as described above.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 stores one or more images or videos that were created using the AR component.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
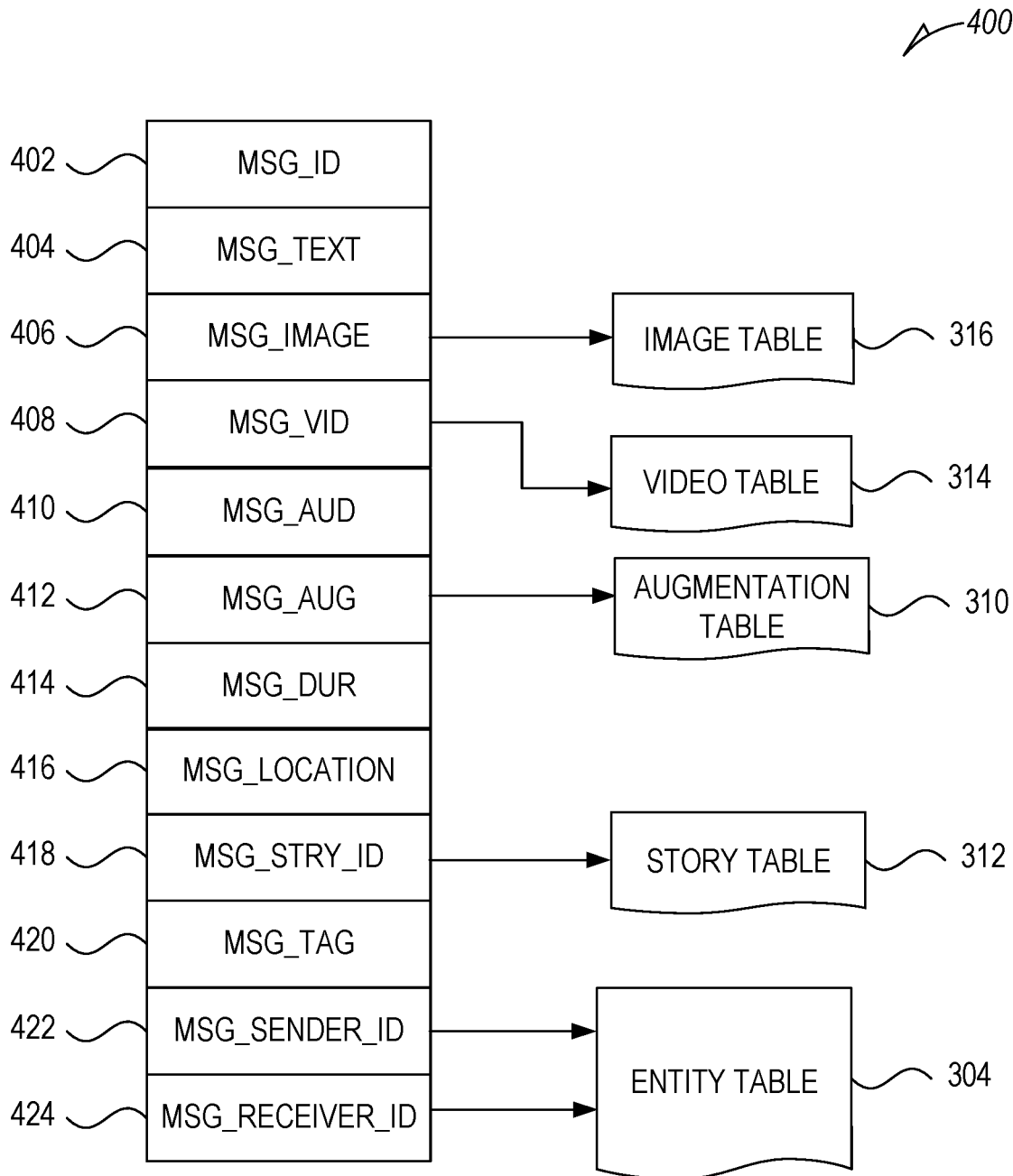
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. The content of a message 400, in some examples, includes an image or a video that was created using the AR component. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
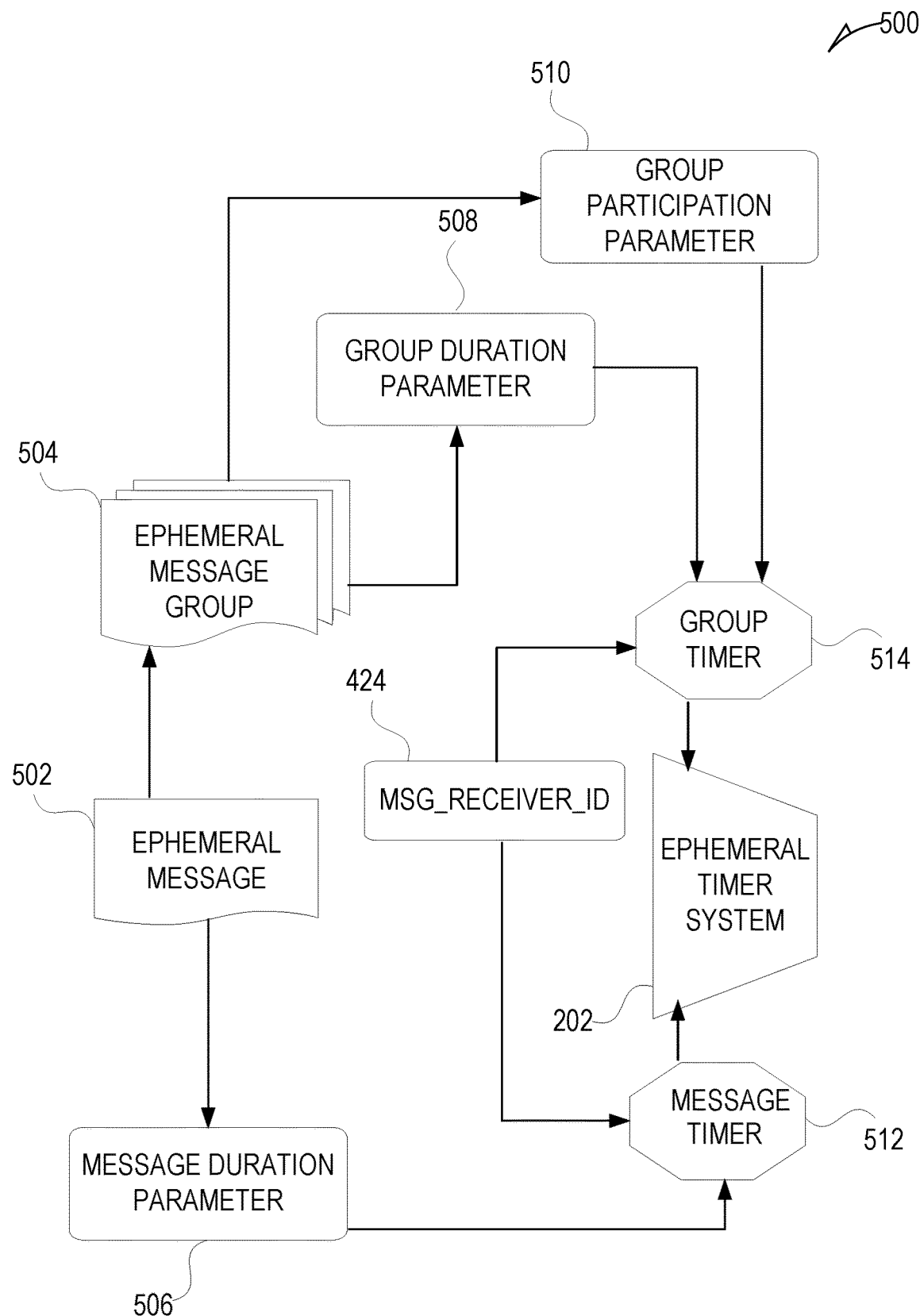
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image or a video that was created using the AR component.

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
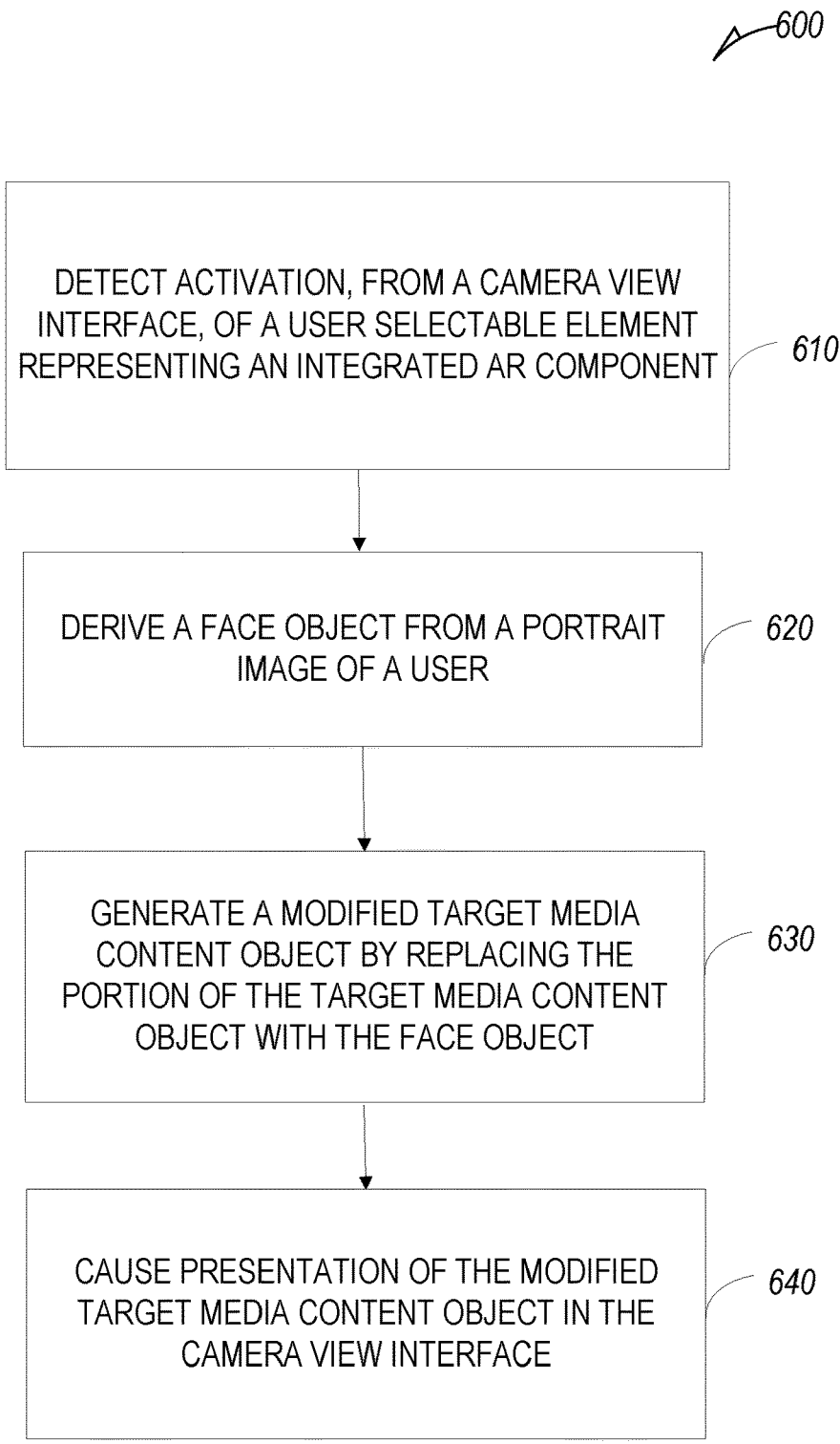
FIG. 6 is a flowchart for providing an augmented reality experience, in accordance with some examples.

FIG. 6 is a flowchart 600 for providing an augmented reality experience using the AR component, in accordance with some examples. In one example embodiment, some or all processing logic resides at the client device 102 of FIG. 1 and/or at the messaging server system 108 of FIG. 1. The method 600 commences at operation 610, when the augmentation system 206 of FIG. 2 detects activation, from a camera view user interface, of a user selectable element representing the AR component. In response to the detecting, at operation 620, the augmentation system 206 accesses a portrait image associated with a user profile representing a user in the messaging system and derives a face object from the portrait image. As explained above, a face object may be derived from a portrait image by means of face detection technology, utilizing, for example, Viola-Jones feature based object detection framework or MTCNN. At operation 630, the augmentation system 206 generates a modified target media content object by replacing the portion of the target media content object with the derived face object. At operation 640, the augmentation system 206 causes presentation of the modified target media content object in the camera view user interface at the client device.

Figure 7:
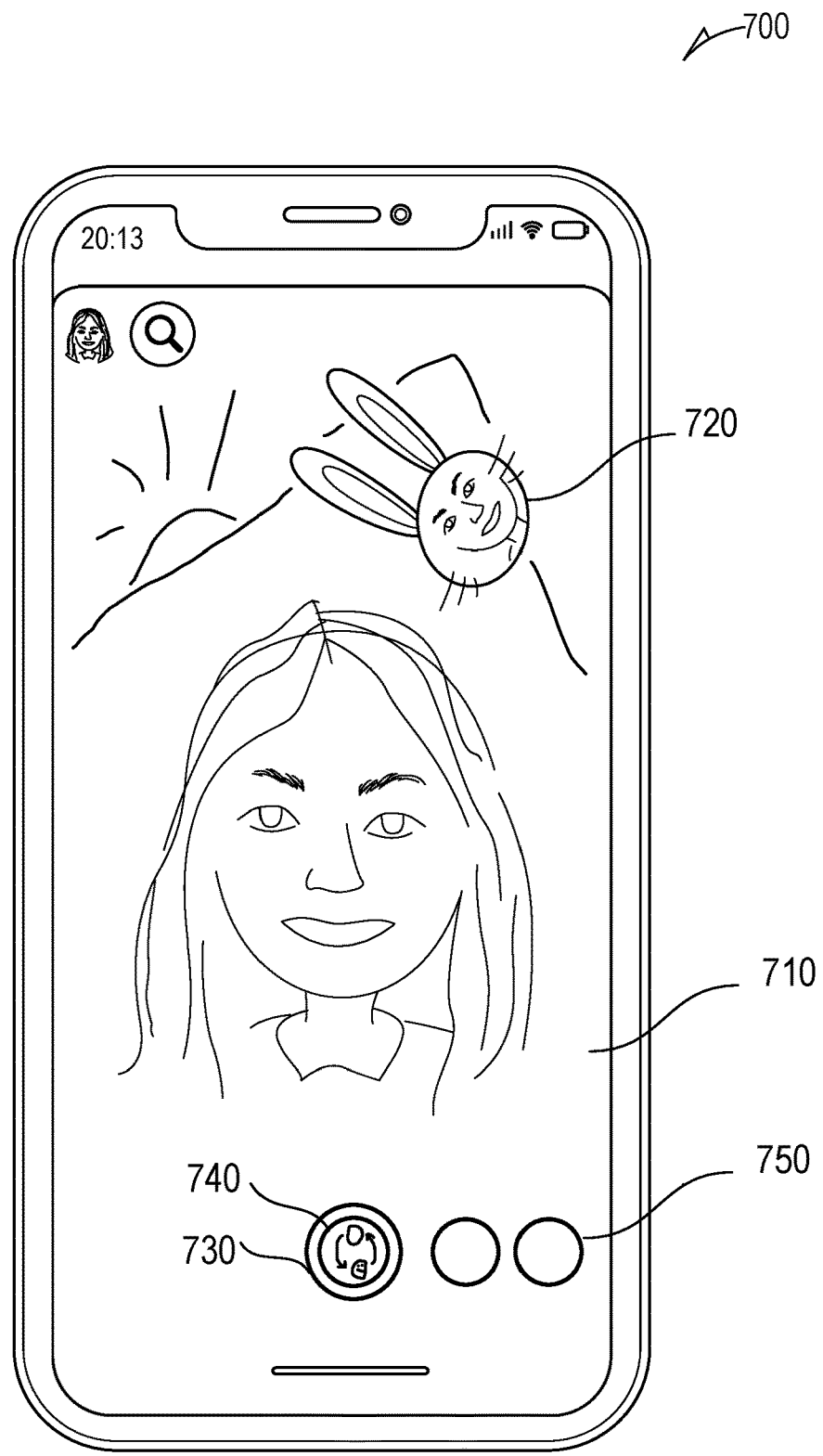
FIG. 7 is a diagrammatic representation of a camera view user interface displaying the output of a digital image sensor of the camera and a modified target media content object, in accordance with some examples.

An example of a camera view user interface 700 displaying the output of a digital image sensor of the camera in area 710 and a modified target media content object 720, which is displayed in the camera view user interface as overlaid over a portion of the output of a digital image sensor of the camera, is shown in FIG. 7. Shown in FIG. 7 is a user selectable element 730 actionable to capture an image by the camera or to start and stop video recording. The graphics 740 indicates that the loaded AR component is the AR component that can perform a modification based on a previously captured and stored image of a user (a portrait image) and overlay it over the area 710 of the camera view user interface 700. A user selectable element 750 represents another AR component, which can be loaded in response to a detected interaction of a user with the user selectable element 750.

Figure 8:
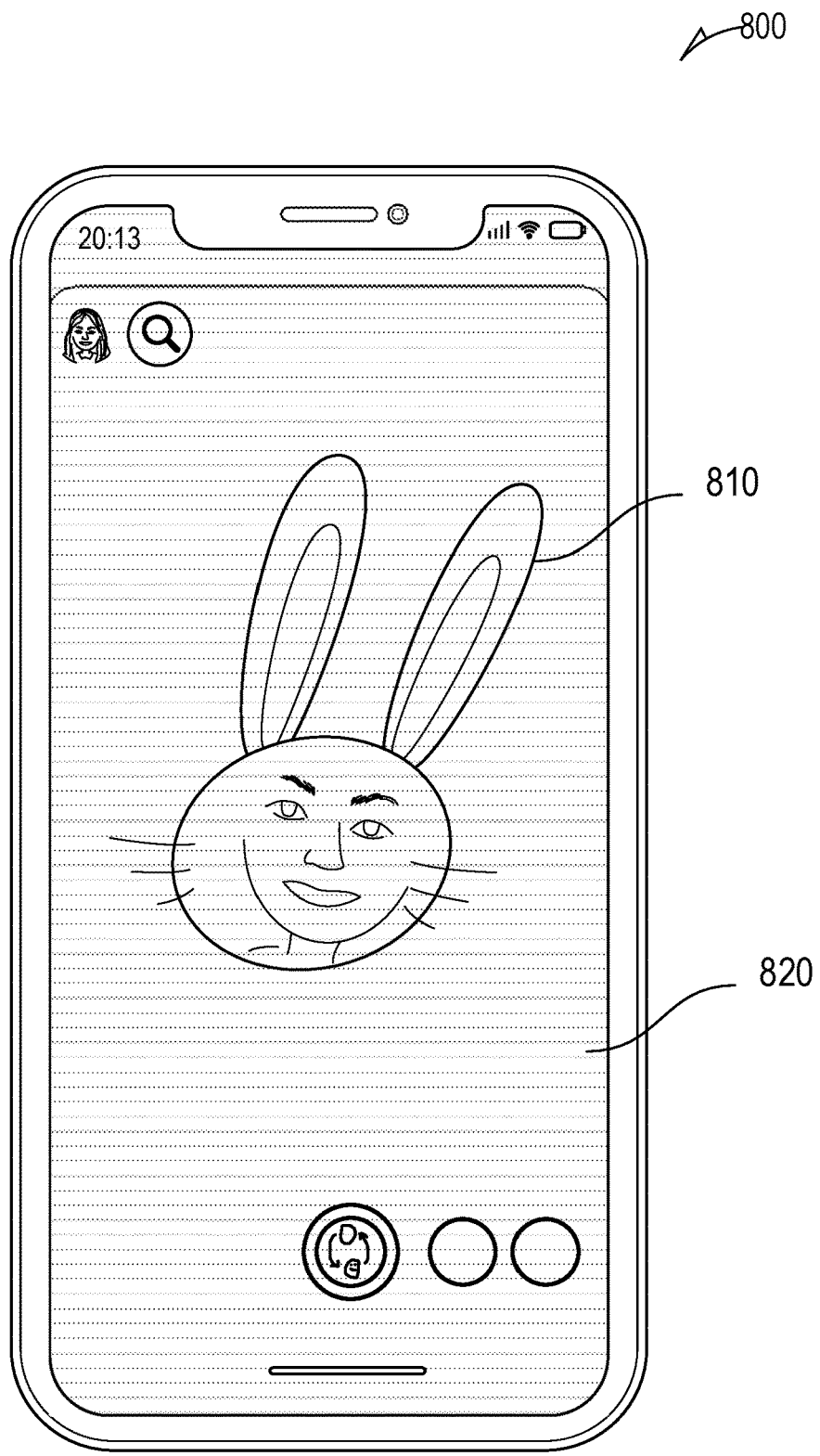
FIG. 8 is a diagrammatic representation of a camera view user interface displaying a modified target media content object with a background displayed instead of the output of a digital image sensor of the camera, in accordance with some examples.

FIG. 8 is a diagrammatic representation of a camera view user interface 800 displaying a modified target media content object 810, with a background displayed in area 820, instead of the output of a digital image sensor of the camera. The background may be, for example, a color, a pattern (as is shown in the area 820), a background image, an animated scene, or a video sequence.

Figure 9:
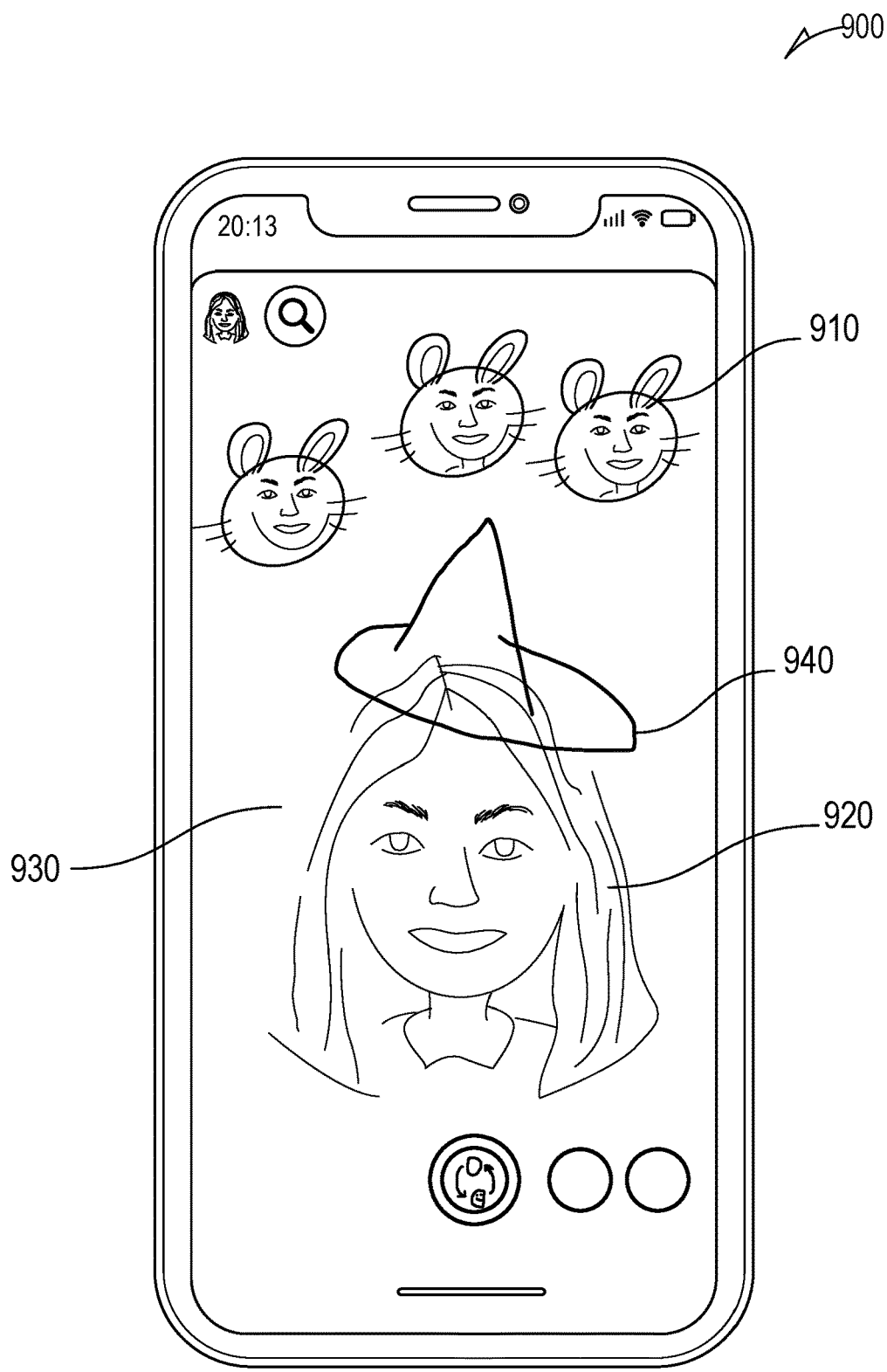
FIG. 9 is a diagrammatic representation of a camera view user interface displaying multiple instances of a modified target media content object, in accordance with some examples.

As explained above, the AR component may include multiple target media content objects, which may be distinct media content items or multiple copies of the same media content item, as shown in FIG. 9. FIG. 9 is a diagrammatic representation of a camera view user interface 900 displaying multiple instances of a modified target media content object 910. The image of a user's head 920, which is captured by a digital image sensor of the camera, is displayed, in area 930, as modified by a modification provided by the associated AR component, which is the addition of a hat 940.

Figure 10:
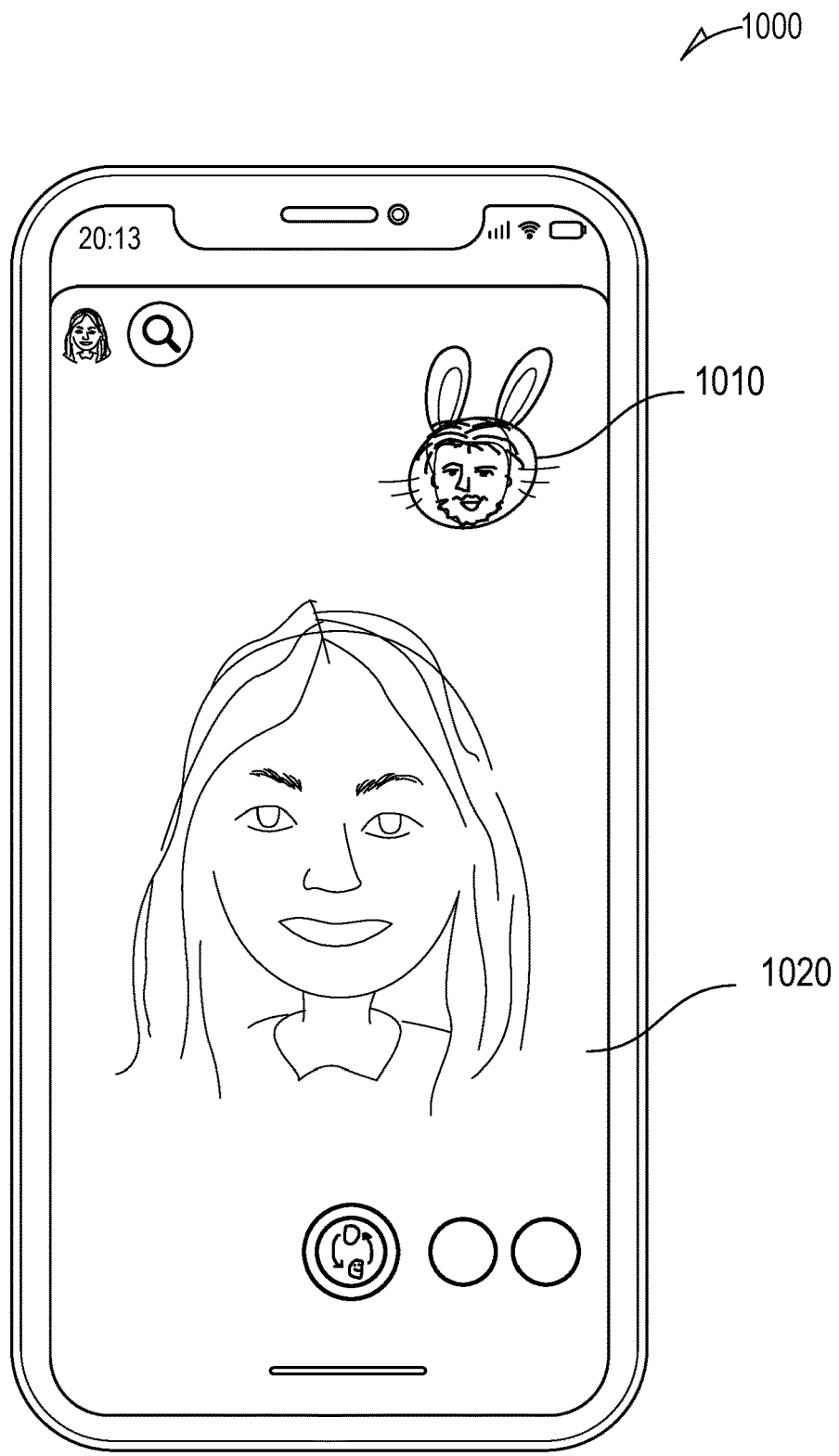
FIG. 10 is a diagrammatic representation of a camera view user interface displaying a target media content object, which was modified using a portrait image of a user's connection, in accordance with some examples.

FIG. 10 is a diagrammatic representation of a camera view user interface 1000, displaying a target media content object 1010, which was modified using a portrait image of a user's connection, in accordance with some examples. As can be seen in FIG. 10, The face included in the modified target media content object is different from the face displayed in area 1020, which displays the output of a digital image sensor of a camera.

Machine Architecture

Figure 11:
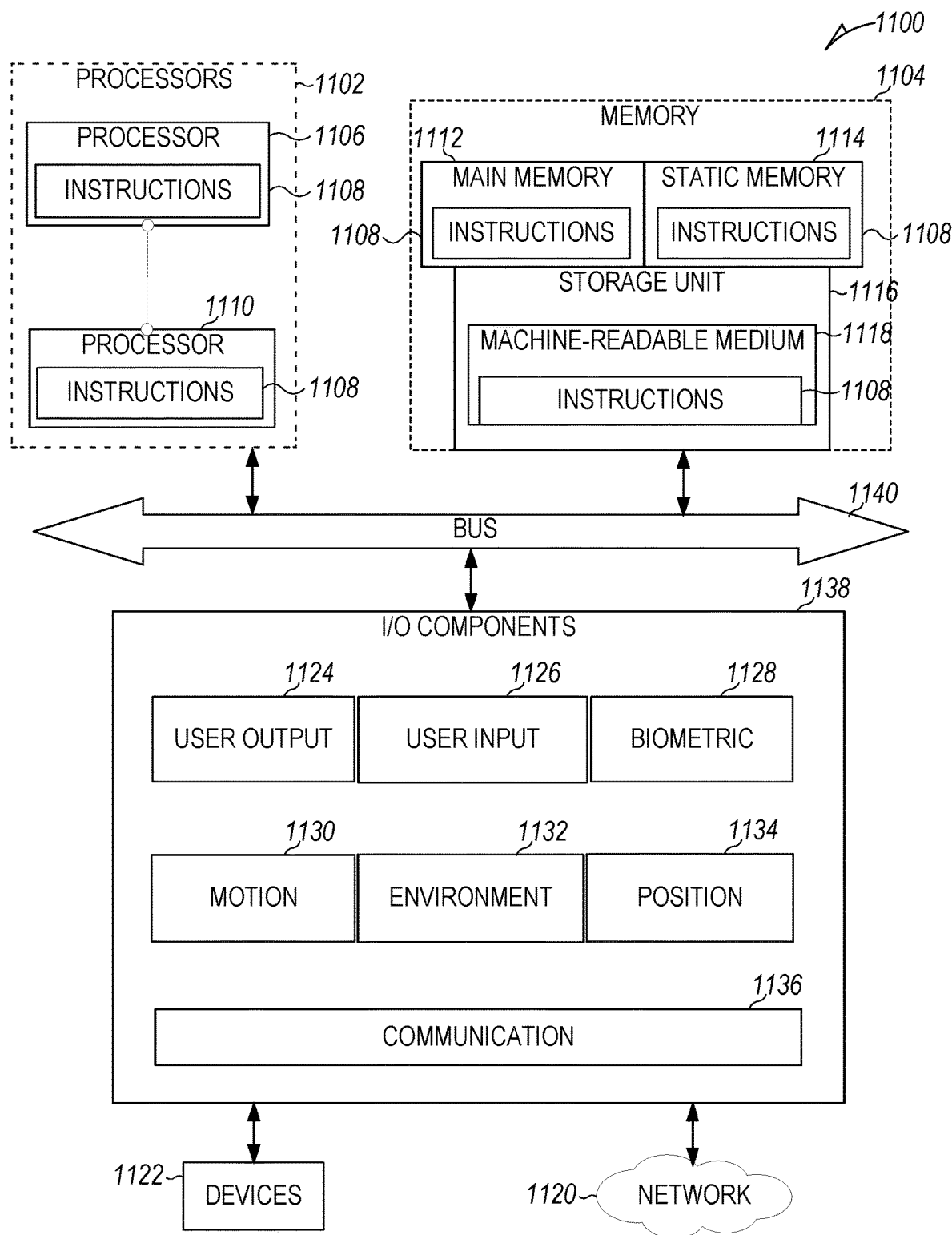
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 600 within which instructions 608 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output I/O components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1140. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 11111, within at least one of the processors 1102 (e.g., within the Processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface Component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 1122.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices: magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    in a messaging system for exchanging data over a network, configuring an augmented reality component to modify, in real time, presentation of an output of a digital image sensor of a camera displayed in an initial camera view user interface by overlaying a modified target media content object over at least one portion of the output of the digital image sensor of the camera;
    causing presentation of the initial camera view user interface at a client device, the initial camera view user interface including the output of the digital image sensor of the camera of the client device, a user selectable element actionable to perform image capture by the camera and a user selectable element actionable to selectively apply or remove a visual effect produced by the augmented reality component;
    detecting activation, from the initial camera view user interface, of the user selectable element actionable to selectively apply or remove the visual effect produced by the augmented reality component;
    in response to the detecting of activation, from the initial camera view user interface, of the user selectable element actionable to selectively apply or remove the visual effect produced by the augmented reality component:
        accessing a face object derived from a previously obtained portrait image associated with a user profile representing a user in the messaging system, and
        generating the modified target media content object by replacing a portion of an initial target media content object with the face object,
    generating a modified camera view user interface, the modified camera view user interface comprising the modified target media content object overlaid over the at least one portion of the output of the digital image sensor of the camera and the user selectable element actionable to perform image capture by the camera and the user selectable element actionable to selectively apply or remove the visual effect produced by the augmented reality component; and causing presentation of the modified camera view user interface at the client device.

2. The method of claim 1, wherein the initial target media content object includes animation.

3. The method of claim 1, wherein the initial target media content object includes live action video.

4. The method of claim 1, comprising determining spatial placement of the modified target media content object in the modified camera view user interface based on movement of the user detected by the digital image sensor of the camera.

5. The method of claim 1, wherein the augmented reality component includes one or more machine learning models for face animation configured to re-render the face object derived from the previously obtained portrait image of the user profile with one or more modifications, wherein the generating of the modified target media content object comprises executing the one or more machine learning models.

6. The method of claim 1, wherein the modified camera view user interface comprises multiple instances of the modified target media content object.

7. The method of claim 1, wherein the user profile represents the user accessing the initial camera view user interface at the client device.

8. The method of claim 1, wherein the user profile represents a connection of the user accessing the initial camera view user interface at the client device.

9. A system comprising:
one or more processors; and
a non-transitory computer readable storage medium comprising instructions that when executed by the one or more processors cause the one or more processors to perform operations comprising:
in a messaging system for exchanging data over a network, configuring an augmented reality component to modify, in real time, presentation of an output of a digital image sensor of a camera displayed in an initial camera view user interface by overlaying a modified target media content object over at least one portion of the output of the digital image sensor of the camera;
causing presentation of the initial camera view user interface at a client device, the initial camera view user interface including the output of the digital image sensor of the camera of the client device, a user selectable element actionable to perform image capture by the camera and a user selectable element actionable to selectively apply or remove a visual effect produced by the augmented reality component;
detecting activation, from the initial camera view user interface, of the user selectable element actionable to selectively apply or remove the visual effect produced by the augmented reality component;
in response to the detecting of activation, from the initial camera view user interface, of the user selectable element actionable to selectively apply or remove the visual effect produced by the augmented reality component:
accessing a face object derived from a previously obtained portrait image associated with a user profile representing a user in the messaging system, and
generating the modified target media content object by replacing a portion of an initial target media content object with the face object, generating a modified camera view user interface, the modified camera view user interface comprising the modified target media content object overlaid over the at least one portion of the output of the digital image sensor of the camera and the user selectable element actionable to perform image capture by the camera and the user selectable element actionable to selectively apply or remove the visual effect produced by the augmented reality component; and
causing presentation of the modified camera view user interface at the client device.

10. The system of claim 9, wherein the initial target media content object includes animation.

11. The system of claim 9, wherein the initial target media content object includes live action video.

12. The system of claim 9, wherein the operations caused by the instructions executed by the one or more processors further include determining spatial placement of the modified target media content object in the modified camera view user interface based on movement of the user detected by the digital image sensor of the camera.

13. The system of claim 9, wherein the augmented reality component includes one or more machine learning models for face animation configured to re-render the face object derived from the previously obtained portrait image of the user profile with one or more modifications, wherein the generating of the modified target media content object comprises executing the one or more machine learning models.

14. The system of claim 9, wherein the modified camera view user interface comprises multiple instances of the modified target media content object.

15. The system of claim 9, wherein the user profile represents the user accessing the initial camera view user interface at the client device.

16. A machine-readable non-transitory storage medium having instruction data executable by a machine to cause the machine to perform operations comprising:
in a messaging system for exchanging data over a network, configuring an augmented reality component to modify, in real time, presentation of an output of a digital image sensor of a camera displayed in an initial camera view user interface by overlaying a modified target media content object over at least one portion of the output of the digital image sensor of the camera;
causing presentation of the initial camera view user interface at a client device, the initial camera view user interface including the output of the digital image sensor of the camera of the client device, a user selectable element actionable to perform image capture by the camera and a user selectable element actionable to selectively apply or remove a visual effect produced by the augmented reality component;
detecting activation, from the initial camera view user interface, of the user selectable element actionable to selectively apply or remove the visual effect produced by the augmented reality component;
in response to the detecting of activation, from the initial camera view user interface, of the user selectable element actionable to selectively apply or remove the visual effect produced by the augmented reality component:
accessing a face object derived from a previously obtained portrait image associated with a user profile representing a user in the messaging system, and generating the modified target media content object by replacing a portion of an initial target media content object with the face object, generating a modified camera view user interface, the modified camera view user interface comprising the modified target media content object overlaid over the at least one portion of the output of the digital image sensor of the camera and the user selectable element actionable to perform image capture by the camera and the user selectable element actionable to selectively apply or remove the visual effect produced by the augmented reality component; and causing presentation of the modified camera view user interface at the client device.

* * * * *